H. W. NOYES.
TRAVELING ROCKER.
APPLICATION FILED MAY 16, 1919.
1,331,664.
Patented Feb. 24, 1920.
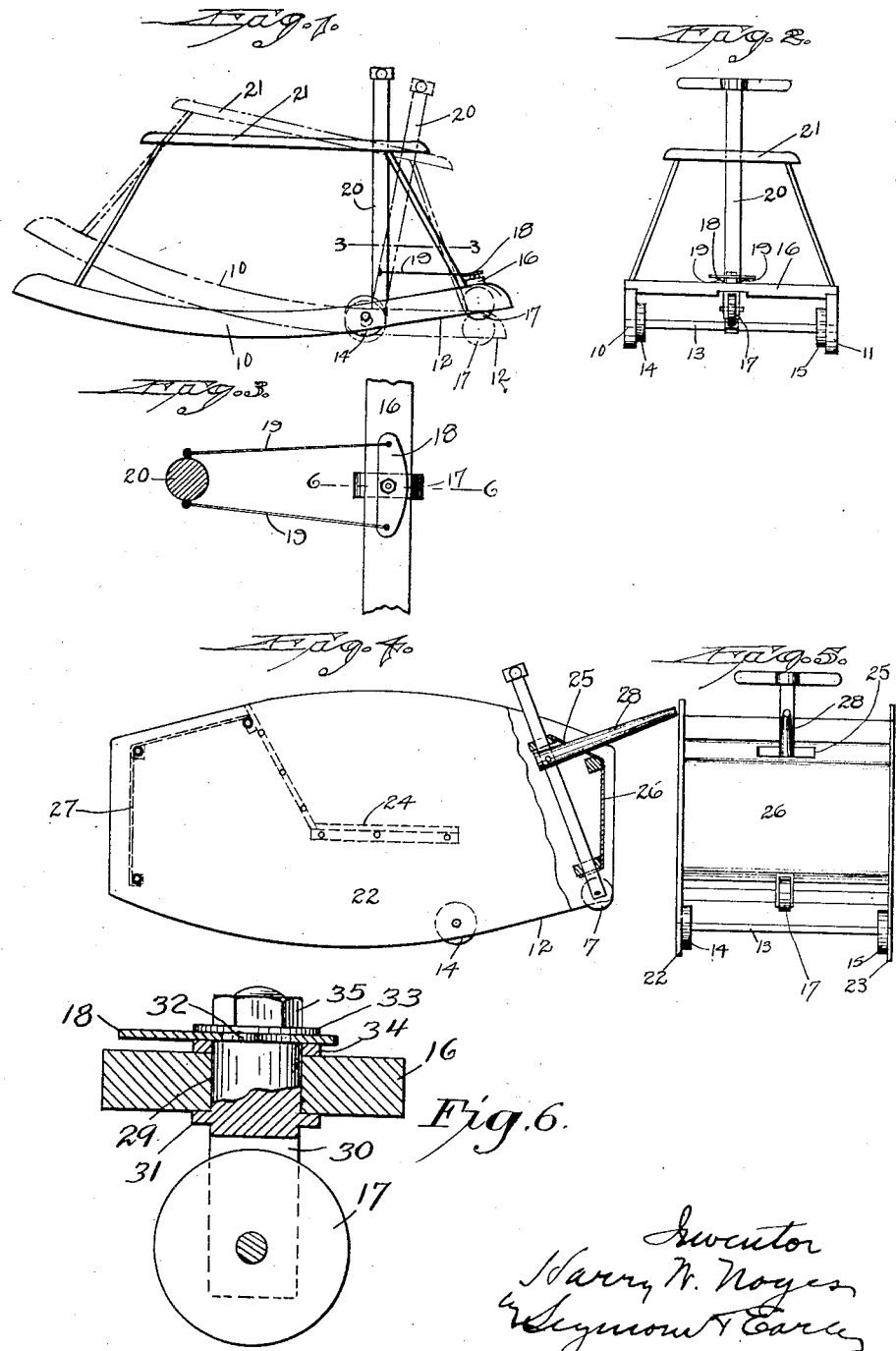

UNITED STATES PATENT OFFICE.

HARRY W. NOYES, OF WEST HAVEN, CONNECTICUT, ASSIGNOR OF ONE-HALF TO JOHN HUGO, OF NEW HAVEN, CONNECTICUT.

TRAVELING ROCKER.

1,331,664.   Specification of Letters Patent.   Patented Feb. 24, 1920.

Application filed May 16, 1919. Serial No. 297,656.

*To all whom it may concern:*

Be it known that I, HARRY W. NOYES, a citizen of the United States, residing at West Haven, in the county of New Haven and State of Connecticut, have invented a new and useful Improvement in Traveling Rockers; and I do hereby declare the following, when taken in connection with the accompanying drawings and the characters of reference marked thereon, to be a full, clear, and exact description of the same, and which said drawings constitute part of this application, and represent, in—

Figure 1 a side view of a traveling rocker constructed in accordance with my invention.

Fig. 2 a front view of the same.

Fig. 3 a sectional view on the line 3—3 of Fig. 1, enlarged.

Fig. 4 a broken side view, illustrating a modified form which my invention may assume.

Fig. 5 a front view of the same.

Fig. 6, a sectional view on the line 6—6 of Fig. 3.

This invention relates to an improvement in traveling rockers, that is, devices adapted for use by children which when rocked, will travel forward, the momentum of the forward rocking movement being sufficient to propel the car for a short distance; the object of the invention being a simple arrangement of parts whereby an attractive rocker of various types may be employed which will also have the capability of traveling forward; and the invention consists in the construction hereinafter described and particularly recited in the claims.

In carrying out my invention I employ two rockers 10 and 11, the rear portions being curved and the front portions 12 presenting a substantially straight line. These rockers are suitably connected together and between them at the rear end of the straight portion is an axle 13 on which wheels 14 and 15 are mounted, the edges of the said wheels extending slightly below the lower edge of the said rockers. The forward ends of the rockers may be connected by a brace 16 in the center of which is mounted the horn 29 of a caster fork 30 in which a steering wheel 17 is mounted. This horn has a plate 31 on which the brace 16 rests and above the brace the horn is formed with an angular portion 32 for positive engagement by means of washers 33 and 34 and a nut 35 with a steering bar 18 which is connected by wires or cords 19 with the sides of a steering post 20 which extends upward above a seat 21 suitably mounted on the rockers. A child sitting on the seat 21 by movement of the body rocks the device and on the forward movement the wheels 14 and 15 contact with the ground, at which time the rounded portions of the rockers are sufficiently lifted above the ground as to permit the device to move forward on the wheels 14 and 15. At this time the caster 17 is in contact with the ground so that it not only aids in supporting the device, but provides means for steering it as the caster may be turned by the movement of the steering post 20. Thus at each forward rocking movement of the device it will travel forward a short distance.

It is obvious that the device may take various forms of bodies, thus as shown in Figs. 4 and 5 of the drawings, the rockers may be formed as sides 22 and 23 of a car simulating in design a motor tank, a seat 24 being mounted between the sides, and instead of having a steering post indirectly connected with the forward roller or caster, it may be directly connected therewith as shown in Fig. 4 of the drawings; and if desired, the simulation of a gun barrel 28 may be attached to the steering post and project outward through a slot 25 formed for it in the front shield 26, which with the rear shield 27, completes the box-like character of the device. The lower edge of the sides follow the same lines as the rockers first described, and the device operates in the same way by the forward movement of the child.

I claim:—

1. A traveling rocker comprising a pair of curved rockers having straight forward ends, wheels mounted on rockers at the rear end of the straight portions, the rims of the said wheels projecting below the lower edge of said rockers; a brace connecting forward ends of the rockers, a steering wheel mounted on the center of the said brace and means for turning said steering wheel.

2. A traveling rocker comprising a pair of rockers having straightforward ends, rocker wheels mounted on the rockers, near the rear ends of the straight portions, the rims of the wheels projecting below the lower edges of the rockers; a centrally arranged steering wheel mounted between forward ends of the said rockers forward of the rocker wheels and means for turning said steering wheel.

3. A traveling rocker comprising a pair of rockers, including curved portions with straight forward ends, rocker wheels mounted on the rockers, near the rear end of the said straight portions, the rims of the wheels extending slightly below the lower edges of the said rockers, a centrally arranged steering wheel mounted between the forward ends of the said rockers, a steering bar connected with said steering wheel, a steering post and connection between said post and said steering bar.

In testimony whereof, I have signed this specification in the presence of two subscribing witnesses.

HARRY W. NOYES.

Witnesses:
FREDERIC C. EARLE,
C. L. WEED.